United States Patent [19]
Emmons et al.

[11] Patent Number: 5,683,119
[45] Date of Patent: Nov. 4, 1997

[54] PIPE JOINT AND SEAL THEREFOR

[75] Inventors: Kurry Brian Emmons, Edison; Jane Zhang, Somerset; Brian James Warner, Rahway; Stephen D'Arcangelis, Edison, all of N.J.

[73] Assignee: Metex Corporation, Edison, N.J.

[21] Appl. No.: 716,661

[22] Filed: Sep. 10, 1996

[51] Int. Cl.⁶ ............................................. F16L 27/053
[52] U.S. Cl. ........................ 285/167; 285/267; 285/910
[58] Field of Search ................................ 285/267, 268, 285/261, 167, 266, 270, 416, 910

[56] References Cited

U.S. PATENT DOCUMENTS

| | | |
|---|---|---|
| 1,034,965 | 4/1912 | Bradley . |
| 2,242,604 | 5/1941 | Wells ............................ 285/167 X |
| 2,323,823 | 7/1943 | Morkey ............................ 285/167 |
| 2,689,752 | 9/1954 | Webster . |
| 4,427,218 | 1/1984 | Duvet et al. .................... 285/261 X |
| 4,530,526 | 7/1985 | Dopyera et al. . |
| 4,583,768 | 4/1986 | Aoki et al. ..................... 285/288 X |
| 4,840,410 | 6/1989 | Welkey . |
| 4,871,181 | 10/1989 | Usher et al. .................... 285/268 X |
| 5,040,805 | 8/1991 | Ozora . |
| 5,203,593 | 4/1993 | Brandener . |
| 5,368,342 | 11/1994 | Latham et al. . |
| 5,462,291 | 10/1995 | Maeda et al. . |
| 5,499,825 | 3/1996 | Maeda et al. . |

FOREIGN PATENT DOCUMENTS

| | | | |
|---|---|---|---|
| 5215284 | 8/1993 | Japan ................................. | 285/261 |
| 606933 | 6/1948 | United Kingdom ................ | 285/261 |

*Primary Examiner*—Dave W. Arola
*Attorney, Agent, or Firm*—William Squire

[57] ABSTRACT

A joint seal has a through bore and two spherical spaced convex surfaces which mate with respective concave spherical surfaces on a pair of adjacent flanges. The flanges are welded to and about the periphery of corresponding spaced pipes one of which is inserted in the bore of the seal. The flanges are joined by two bolts, one flange being fixedly secured to the bolts and the other resiliently movably secured to the bolts by a pair of springs to permit that other flange to rotate in response to rotation of the pipe affixed thereto. The one flange forms a static wedge-like seal joint with one of the pipes and the other flange a dynamic seal joint with the respective seal spherical surfaces, the spherical seal and flange surfaces being urged together in wedged relation by the springs.

21 Claims, 1 Drawing Sheet

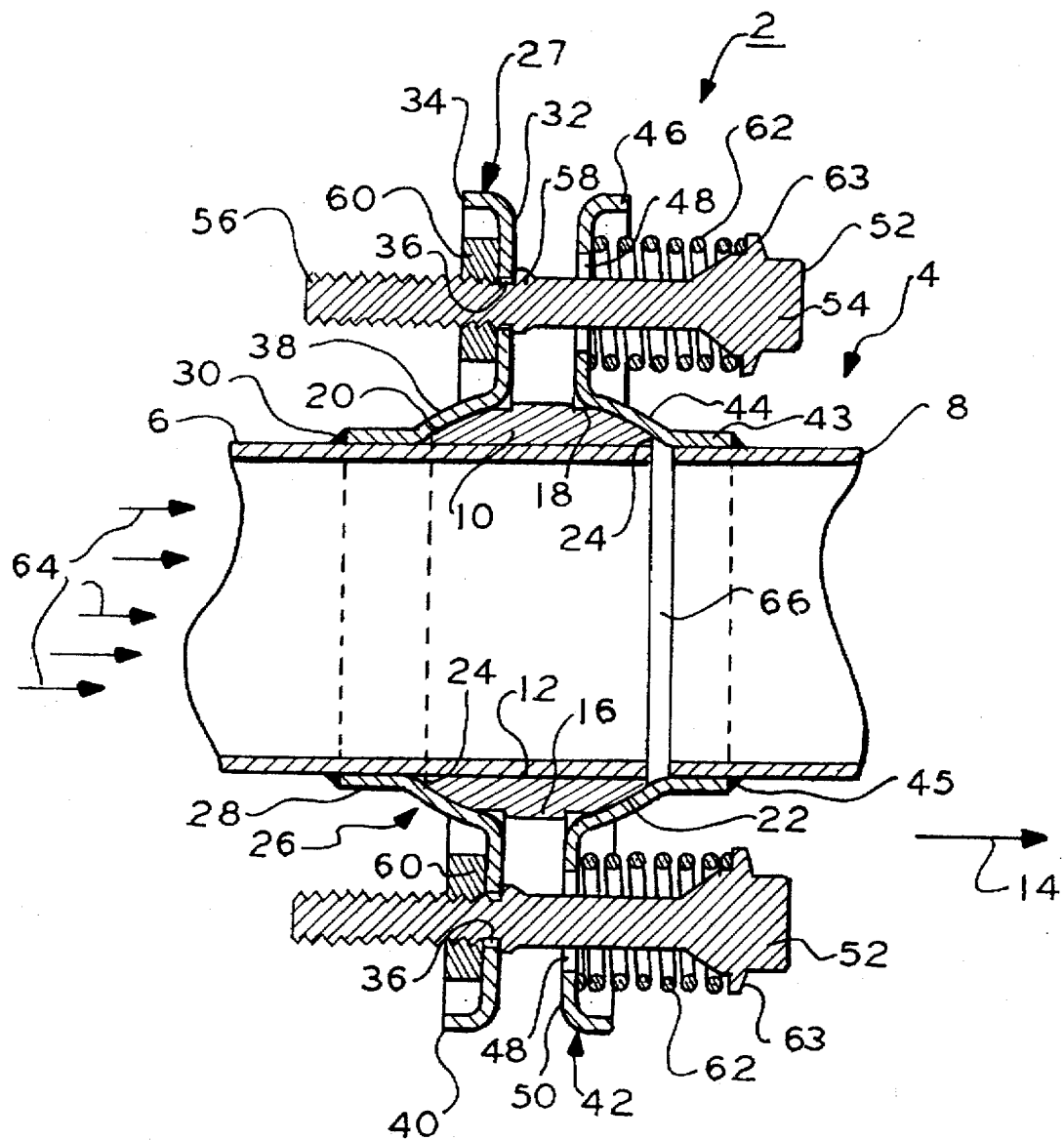

5,683,119

PIPE JOINT AND SEAL THEREFOR

This invention relates to pipe joints employing spherical seals for automotive exhaust systems.

Pipe joints for certain automotive exhaust systems employ seals with spherical surfaces. For example, prior art joints and seals are disclosed in U.S. Pat. Nos. 5,499,825 and 5,040,805, incorporated by reference herein. Typical exhaust joints comprise a seal, usually formed into a preform of a wire mesh and filler material, and then crushed by dies to the end seal shape as illustrated in the aforementioned patents. The seals may be rigid or compliant in accordance with the seal construction. A lubricant or lubricating material is incorporated in the seal to provide a lubricating surface.

The seals are annular with a radially outer convex spherical segment surface and opposing planar end surfaces as shown in U.S. Pat. No. 5,499,825. In this patent, a circular cylindrical through bore communicates with the planar end surfaces for receiving a pipe concentric with the spherical annular surface. A flange is welded in fixed position to the received pipe spaced from the pipe end edge and has a planar surface abutting one of the seal planar surfaces. The flange fixes the axial position of the seal. The seal spherical surface terminates adjacent to the flange. The other planar surface of the seal terminates approximately flush with the pipe end edge. The seal thus has an annular bore surface abutting the pipe outer circumference and a circular disc-like plane surface normal to the bore abutting the flange.

A second movable flange has a concave surface mating with the seal convex surface to form a dynamic engagement therewith. The two flanges each have a pair of aligned apertured flange members. A bolt is screwed to the flange members of the fixed flange. A compression spring is between each flange member of the movable flange and captured to the bolt by a bolt head. The springs resiliently urge the dynamic flange concave surface in engagement with the seal convex surface.

A second pipe is secured to the dynamic flange. The second pipe thus can resiliently rotate relative to the first pipe about the engaged spherical surfaces. A similar joint is illustrated in U.S. Pat. No. 5,040,805. The purpose of these joints is to provide a relatively fluid tight seal for exhaust gases conducted through the pipes at the joint while permitting the pipes to move relative to one another.

The present inventors recognize a problem with these joints. They recognize that in such prior art joints the cylindrical and planar mating surfaces in abutment together do not provide a sufficiently fluid tight seal for the exhaust gases at the interface of the two joined pipes. They recognize that the fixed flange and mating pipe cylindrical mating surfaces and the flat surface of the seal with the mating flat flange surface provide a relatively high gas leakage path.

A joint and seal according to the present invention is directed to solving this problem of gas leakage by minimizing such leakage.

A seal according to the present invention comprises a circular member having opposing ends and an axially extending central through bore for receiving a first pipe at one of the ends along an axis. A first surface is at the one end concentric and tapered relative to the axis. A second convex spherical segment surface is at the other of the ends concentric to the axis and an axially extending segment is between the convex surfaces. As a result, the planar static leakage path between the seal and flange of the prior art is changed by the present invention to a wedge-like static seal which enhances the sealing action as compared to the sealing action of the prior art planar surfaces.

A fluid pipe joint according to one aspect of the present invention comprises first and second pipes aligned for conveying a fluid, each pipe having an outer cylindrical surface. A seal has a central opening therethrough defining an axis and in which opening the first pipe is disposed, the seal having a first annular surface inclined relative to and extending about the axis and a second annular convex spherical surface extending about the axis.

A first flange has a surface for mating with and engaging the seal first surface and is secured in fixed position and substantially fluid impervious relation to and about the first pipe outer surface. A second flange has a concave spherical surface for mating with and engaging the seal second surface and is secured in fixed position and in substantially fluid impervious relation to and about the second pipe outer surface. Bolt means are secured to the first flange in fixed position, the second flange being secured to the bolt means in resilient movable relation for permitting the second pipe to rotate relative to the first pipe about the seal second spherical surface and for resiliently axially urging the flanges against the corresponding seal spherical and inclined surfaces.

IN THE DRAWING

The sole FIGURE is a side elevation sectional view of a joint and seal according to the present invention.

In the FIGURE, joint assembly 2 is particularly adapted for use with automotive exhaust systems. However, the assembly may be employed in other fluid distribution systems in which it is desired that one pipe be relatively movable with respect to a second pipe in the system. The assembly 2 comprises a joint 4 for sealingly attaching a circular cylindrical, preferably stainless steel, pipe 6 to a second circular cylindrical, preferably stainless steel, pipe 8. Pipes 6 and 8 are conventional for use in automotive exhaust systems for conveying hot toxic combustion engine exhaust gases.

In such exhaust systems, the joint must be essentially leak proof while permitting one pipe to rotate with three degrees of rotational freedom and no translation relative to the other. When automobiles, for example, are stationary, leaking exhaust gases may undesirably seep into the vehicle passenger cabin. If the joint is prior to the catalytic converter, untreated exhaust gas may escape. Under certain operating conditions, air can be drawn into the joint by a lower pressure within the joint.

In sophisticated systems, an oxygen sensor senses the oxygen content of the exhaust gas in the exhaust pipes. If air is drawn into the joint via a leak, the sensor may sense an erroneous lean condition. A computer in response may cause a richer mixture of fuel-air to be supplied to the engine, resulting in higher undesirable emissions and poorer fuel economy. The joint and seal of the present invention minimizes such leaks.

A seal 10 according to an embodiment of the present invention is preferably formed with a reinforcing matrix of a knitted wire mesh, which may be stainless steel and comprising wire of a diameter determined by a given implementation, a filler material which may be vermiculite or mica and a lubricant such as graphite. These materials may be combined according to a given implementation and may form a preform during a stage of fabrication of the seal. Examples of such preform materials are disclosed in the aforementioned U.S. Pat. Nos. 5,499,825 and 5,040,805, incorporated by reference herein. Also, disclosed in these patents are techniques for forming preforms for use in an automotive exhaust joint arrangement using seals of the type disclosed therein.

The resulting preform, generally planar, is flexible and wrapped about a mandrel to form a cylindrical structure as shown for example in U.S. Pat. Nos. 5,499,825 and 5,040, 805. For example, in U.S. Pat. No. 5,499,825, a knitted wire net of stainless steel fine wire is combined with a sheet of heat resistant material such as expanded graphite, mica or asbestos. A lubricating composition is then coated on the sheet material which is placed within the knitted wire mesh. This structure is then wrapped about a mandrel in a female die of cylindrical shape. A male cylindrical die is inserted into the female die compressing the preform material in the female die, forming the preform into the desired seal configuration.

Other forms of the composite material may include powder matrices added to the female die after the wire mesh is wrapped about a core in the female die. This powder matrix material tends to be external the wire mesh in the formed seal. The combination of materials is then compressed with a male die to form the seal.

In U.S. Pat. No. 5,040,805, a knitted wire mesh is wound about a core. An expanded graphite sheet is disposed over the uncoiled wire mesh. Both are wound cylindrically in succession on a partial cylindrical part and a preform body with a refractory material projecting on an end portion of the preform body is formed.

Depending upon the wire mesh parameters, e.g., wire size and knit loop spacing, and the filler material, the resulting seal can be compliant or relatively rigid.

In one form, the lubricant may be a graphite sheet material wrapped about the wire mesh preform. In a further embodiment, a powder composite, a lubricating material such as graphite and the wire mesh are placed in the female die. When compressed, the resultant structure is relatively hard and rigid. The lubricating material is placed to form a lubricating surface on the seal for dynamic action with a mating flange surface.

The seal 10 is circular with a through bore 12 extending in axial direction 14. The seal 10 has a circular outer cylindrical surface segment 16. Next adjacent and oppositely disposed relative to the segment are circular cylindrical portions 18 each forming a step with the segment 16. The segment 16 is shown as a raised ridge but this raised ridge is not essential and is provided only for purposes of enhancing the manufacturing tooling not connected with the present invention.

In the alternative, the segment 16 may be flush with the adjacent radial outer surfaces of portions 18 to form a single continuous circular cylindrical segment (not shown).

An annular convex spherical segment surface 20 is on one side of the segment 16 and a second mirror image annular convex spherical segment surface 22 is on the opposite side of the segment 16. The surfaces 20 and 22 are flush with the respective corresponding surfaces of portions 18 and terminate at the seal ends in respective annular radial planar surfaces 24. The surfaces 20 and 22 may be generated from a radius emanating from a common center or preferably from spaced centers.

The surface 22 slopes inclined relative to the cylindrical inner annular surface 12 and axis 25 about which surface 12 is concentric. The angle of inclination is such that surfaces 12 and 22 form a tapered wedge-like configuration in section as shown in the FIGURE terminating at end surface 24 normal to axis 25.

The mirror image surface 20 is identical to surface 22 so that it does not matter which surface is assembled to the joint in directions 14 and 14'. This is to ease manufacturing assembly of the joint so that the assembly does not require selection of either surface 20 or 22 in a given seal orientation relative to pipes 6 and 8 and direction 14. As a result the seal surface 20 also forms an annular wedge-like configuration with the seal surface 12. This wedge-like configuration is important as will be described.

In the alternative, the surface 20 need not be a mirror image of surface 22. The surface 20 may be conical, a segment of an oval or other shapes so as to form a wedge-like structure with surface 12. That is, the tapering end of surface 22 corresponding to opposite end surface 24 should be the narrowest and the more central region is the widest portion of the seal at this end of the seal.

A relatively small angle of inclination of convex spherical surfaces 20 and 22 (or otherwise tapered or conical surface 20) to axis 25 adjacent to end surface 24 at opposite seal ends, e.g., about 35° for example, is desired to obtain the wedge-like configuration.

In the alternative, where the surface 20 of the seal is conical or other tapered shapes, the inclination is preferably similar to the angle noted above to form the desired wedge configuration. However, it should be understood that only the surface 20 may be non-spherical as this surface is for static engagement as explained below. In contrast, the surface 22 is in dynamic engagement and is spherical to permit rotational action with the mating flange described below.

A static flange 26 comprises preferably a stamped stainless steel sheet having an annular leg 28 forming a bore for closely receiving pipe 6. The edge of the leg 28 is welded to the pipe 6 at weld 30 to form a gas impervious seal between the leg 28 and pipe 6 in a continuous annular seam. The weld 30 fixes the flange 26 axially to pipe 6. The weld is used to allow for hot exhaust gases. In the alternative, in an environment where heat is not a factor, other sealing arrangements may be employed for sealing and fixedly securing the pipe 6 to the flange 26.

The flange 26 has a preferably generally triangular in plan view flange member 27. Member 27 comprises a planar generally triangular in plan view leg 32 extending radially from one side of leg 28. A peripheral reinforcing rib 34 upstands from the leg 32. The shape and configuration of the flange may be in other forms according to a given implementation. A through aperture 36 is in leg 32. An annular concave preferably spherical flange portion 38 extends from the leg 28 spaced about pipe 6 and connects leg 32. The flange portion 38 concave spherical surface engages and mates with the seal convex spherical surface 20 in relatively static gas sealing relation about the pipe 6.

In the alternative, should the surface 20 be conical or otherwise tapered in other shapes, the flange portion 38 concave surface is shaped to mate with and engage such a tapered surface.

A second flange member 40 preferably identical in construction as member 27 extends from concave portion 38 on a side of the flange 26 opposite to the member 27.

A second flange 42 is preferably identical to flange 26 in shape and configuration except for its apertures (and only when the flange portion 38 is spherical). The flange 42 has a circular cylindrical leg 43 that receives pipe 8. The leg 43 is welded to pipe 8 at weld 45 which forms a continuous fluid impervious seam about the pipe 8. In the alternative, fixation and sealing of the pipe 8 to the flange 42 may be by other structure as described above for use with lower temperature fluids.

The leg 43 is connected to annular flange portion 44. Portion 44 has a concave preferably spherical shape preferably identical to flange portion 38 (only when portion 38 is spherical). Portion 44 extends about and is in sealing mating engagement with seal 10 spherical surface 22. Flange members 46 and 50 extend radially outwardly from portion 44 in opposite directions.

Flange members 46 and 50 each have an aperture 48 different from corresponding aperture 36 in flange member 32 and the corresponding aperture 36 in flange member 40. Apertures 48 are larger in diameter than apertures 36. A second flange member 50 in mirror image relation to and identical to member 46 is on the opposite side of flange 42 connected to portion 44. Otherwise the flange 42 may be identical to flange 26.

The apertures 48 of flange members 46 and 50 are axially aligned parallel to axis 25 with the apertures 36 of the respective flange members 27 and 40. A bolt 52 is in each of the aligned aperture pairs of the respective aligned flange members 34, 46 and 40, 50. Bolt 52 has a head 54 at one end and a threaded stud 56 at its other end. A shoulder 58 is adjacent to the stud 56. A nut 60 axially locks the flange member 27 to the shoulder 58 in fixed axial position. The other bolt 52 is similarly secured to flange member 40. The seal 10 is thus axially locked in wedge relation between the pipe 6 and the mating spherical seal surface 20 and the flange portion 38 in a direction opposite direction 14. Thus the seal 10 is in static wedged relation to the flange 26 and pipe 6.

A compression coil spring 62 is between an annular flange 63 on each of the bolt 52 heads 54 and flange member 46 and receives the respective bolts 52 therethrough. With the nuts 60 in place, the springs 62 are compressed and resiliently urge the flange 42 in a direction opposite direction 14. This action seats the flange 42 spherical portion 44 against the spherical seal surface 22 in substantial fluid tight but dynamic relation. This action also seats the seal 10 spherical surface 20 in fluid tight static relation with the flange portion 38 spherical concave surface.

The bolts 52 have a diameter smaller than apertures 48 so as to float transversely in these apertures. This floating action permits the flange 42 to rotate in response to rotation of the pipe 8 relative to pipe 6 with three degrees of rotation freedom and no translation.

In operation, the exhaust gas 64 flows through the pipes 6 and 8 and the junction 66 therebetween. The gas 64 can not flow between the pipe 8 and flange 42 leg 43 to the ambient atmosphere because of the weld 45. Similarly the gas can not flow between leg 28 and the pipe 6 to the ambient atmosphere because of weld 30.

The gas 64 may follow two other paths. One path is between the seal 10 surface 12 and pipe 6 to the interface between seal 10 convex surface 20 and concave flange portion 38. However, because the seal 10 is in static engagement with the flange portion and is spherical, the leakage therebetween is minimized as compared to the planar surfaces of the prior art joints.

The resilient axial load of the springs 62 forces the seal 10 generally in axial direction 14'. The tapered seal 10 at the end adjacent to the surface 20 and the mating surface of the static flange portion 38 is wedged into the mating wedge-like shape of the cavity between the flange portion 38 and the pipe 6. This wedging action produces a relatively high normal sealing force between the seal 10, flange portion 38 and pipe 6. This action provides an improved fluid tight seal as compared to prior art non-wedged planar surfaces as discussed in the introductory portion.

In this context, the wedging action may be obtained with non-spherical surfaces at the static flange, e.g., by conical or other similarly shaped mating surfaces between the flange and seal. In those instances where the seal 10 is compliant, it may be compliant in the radial direction normal to the pipe 6. In this case, the flexing seal in response to the wedging action provides enhanced sealing action with the pipe 6 in the radial inward direction, further reducing potential leaks therebetween.

A second path would be between the spherical seal surface 22 and the concave flange portion 44. This too is a relatively fluid tight seal and minimizes gas leakage. Therefore, gas leakage is substantially precluded by the dual spherical sealing surfaces of the seal 10.

It will occur to one of ordinary skill that modifications may be made to the disclosed embodiments. For example, the spherical seal surfaces need not be separated by a cylindrical flush or upstanding surface but by surfaces of other shapes such as a channel or a non-cylindrical ridge. The seal 10 and its two spherical surfaces 20 and 22 preferably correspond to the surfaces of a semisphere. The semisphere is sliced into three parallel segments wherein the seal 10 is in the form of a medial sliced segment. Therefore, the two spherical convex seal surfaces may have a radius emanating from a common center. However, this is not essential. The radii of the two spherical surfaces may emanate from two axially spaced centers.

While the seals are preferably formed of knitted wire mesh, they may be formed as solid metal structures, e.g., powdered composite without a mesh reinforcement. Also, the seal may be forged, machined, cast or otherwise formed. The mesh may or may not be knitted. The reinforcement may be made of non-metallic materials. It is intended that the scope of the invention be defined by the appended claims, the description herein being given by way of illustration and not limitation.

What is claimed is:

1. A fluid pipe joint comprising:

first and second pipes aligned for conveying a fluid, each pipe having an outer cylindrical surface;

a seal having a central opening therethrough defining an axis and in which opening the first pipe is disposed, said opening being defined by a cylindrical surface coaxial with said axis and abutting the first pipe, said seal having a first annular radial outer surface tapering relative to and extending about said axis and tapering toward and extending about said cylindrical surface adjacent to a first seal edge for forming an annular wedge-like member between said tapering outer surface and said inner cylindrical surface adjacent the first edge and a second annular convex spherical surface extending about said axis adjacent to a second seal edge opposite the first edge;

a first flange with a tapering surface for mating with and engaging the seal first surface and secured in fixed position and substantially fluid impervious relation to and about the first pipe outer surface, said first pipe outer surface and first flange forming an annular wedge-like recess for receiving the seal in wedge-like relation thereto;

a second flange with a concave spherical surface for mating with and engaging the seal second surface and secured in fixed position and in substantially fluid impervious relation to and about the second pipe outer surface; and bolt means secured to the first flange in fixed position, said second flange being secured to the bolt means in resilient movable relation for permitting the second pipe to rotate relative to the first pipe about said seal second spherical surface and for resiliently axially urging the flanges against the corresponding seal spherical and inclined surfaces and for urging the seal first edge into said recess to wedge the seal between the first flange and said first pipe outer cylindrical surface in said wedge-like relation.

2. The joint of claim 1 wherein the seal first and second surfaces are axially spaced by an intermediate cylindrical segment.

3. The joint of claim 1 wherein the seal is formed of compliant material.

4. The joint of claim 1 wherein the seal first surface is convex spherical and the first flange has a concave spherical surface for engaging the seal first surface.

5. The joint of claim 1 wherein the bolt means comprises first and second bolts each secured to the first flange in fixed relation and to the second flange in spaced relation and a spring secured between each bolt and the second flange.

6. The joint of claim 1 wherein the seal is formed of knitted wire mesh wrapped with a solid lubricant sheet material and compressed.

7. The joint of claim 1 wherein the first and second flanges are respectively welded to the corresponding first and second pipes in an annular continuous seam about the corresponding pipe.

8. The joint of claim 1 wherein the seal first and second surfaces are axial spaced and including a circular cylindrical portion therebetween.

9. The seal of claim 1 wherein the first and second seal surfaces are spherical and are mirror images of each other.

10. A fluid pipe joint comprising:

an annular seal having a central opening formed by an inner cylindrical surface defining an axis and a first annular outer surface extending about the opening and tapering relative to said axis toward said inner cylindrical surface to form an annular wedge-like member with said seal inner cylindrical surface adjacent to a first seal end, said first surface tapering radially outwardly toward a relatively wider medial section spaced from the first seal end and a second annular convex spherical surface extending about said opening tapering from the medial section toward said seal inner surface at a seal end opposite the first end, said inner cylindrical surface extending to and between said first and second ends;

a first pipe extending in an axial direction and having an outer cylindrical surface abutting said seal inner cylindrical surface in said central opening;

a first flange having a first tapered surface engaged with and mating with the seal first tapering surface forming an annular wedge-like shaped recess with said first pipe outer cylindrical surface, said first flange being secured in fixed position in fluid impervious relation to and about said first pipe section outer cylindrical surface, said first flange having at least one first flange member extending radially outwardly relative to said seal whereby the seal tapering surface is fully seated between the first flange and the first pipe in wedge-like sealing relation against the first flange tapered surface;

a second flange having a second concave spherical surface engaged with and mating with the seal second spherical surface in arcuate sliding relation thereto, said second flange having at least one second flange member extending radially outwardly relative to said seal, the at least one first flange member being juxtaposed with and corresponding to the at least one second flange member;

a second pipe aligned with the first pipe for receiving an axially flowing fluid from the first pipe, the second pipe having a cylindrical outer surface fixed to said second flange in fluid impervious relation to the second flange; and bolt means secured to the at least one first flange member and to the at least one second flange member to resiliently axially urge the first and second surfaces of said flanges in abutment with the respective seal first and second surfaces in said wedge-like sealing engagement while permitting the second pipe to move relative to the first pipe.

11. The joint of claim 10 wherein the seal first and second surfaces are spherical, are axially spaced from each other and mirror images of each other.

12. The joint of claim 11 wherein the flanges are identical mirror images of each other.

13. The joint of claim 10 wherein the seal first and second surfaces are axially spaced.

14. The joint of claim 10 wherein the first seal annular tapered surface and the first flange annular tapered surface are spherical.

15. In a joint for fluid coupling first and second fluid pipes including a first flange for movably coupling the first pipe in movable sealing engagement with a seal relative to a second flange and relative to the second pipe, said second flange for securing the second pipe thereto and to the seal in a relatively fixed position, said joint including means for resiliently urging said first flange and the seal toward the second flange with the seal and flanges in sealing engagement while permitting said first flange and first pipe to move relative to the second flange, to said second pipe and to said seal, said seal comprising:

an annular member having first and second annular radially outwardly facing surfaces terminating adjacent to respective opposite annular seal edges and facing in opposing axial directions and a central axially extending opening therethrough forming an inner cylindrical seal surface extending to said edges for receiving said second pipe, said first surface tapering toward said inner cylindrical surface at one of said edges generally in said axial direction and dimensioned for sealing wedge-like engagement with the second flange and in wedge-like engagement with said second pipe, said second surface being spherical and dimensioned for rotational sealing engagement with said first flange, said first flange for urging the seal in engagement with and between the second flange and second pipe.

16. In the joint of claim 15 wherein the seal includes a circular cylindrical segment between said first and second surfaces.

17. In the joint of claim 15 wherein the first tapered surface is spherical.

18. A seal comprising:

a circular member having opposing ends and an axially extending central cylindrical through bore extending between and to the ends forming an inner cylindrical surface extending to said ends for receiving therein a first pipe along an axis;

a first radially outwardly facing surface of said circular member terminating at one of said ends concentric to and tapering toward said axis and toward said inner surface at said one end forming an annular convex wedge-like member at said one end;

a second radially outwardly facing convex spherical segment surface at the other of said ends concentric with said axis, said second segment tapering toward said axis and said inner cylindrical surface at said other end generally in mirror image spaced relation relative to said first surface; and an axially extending radially outwardly facing segment between said first and second surfaces for axially spacing said first and second surfaces.

19. The seal of claim 17 wherein the first surface is convex and spherical.

20. The seal of claim 17 wherein the seal comprises a wire mesh with a filler material compressed to form a solid structure.

21. A fluid pipe joint comprising:

first and second pipes aligned for conveying a fluid, each pipe having an outer cylindrical surface;

a seal having a central opening therethrough defining a continuous inner cylindrical surface extending through the seal and defining an axis and in which opening the first pipe is disposed, said seal having a first radially outwardly facing annular surface forming a wedge-like member extending about said axis with said inner cylindrical surface and a second annular convex spherical surface extending about said axis;

a first flange with a first surface for engaging the seal first annular surface in wedge-like fully seated fluid sealing relation in cooperation with the first pipe and secured in fixed position and substantially fluid impervious relation to and about the first pipe outer surface;

a second flange with a concave spherical surface for dynamically engaging the seal second annular spherical surface and secured in substantially fluid impervious relation to and about the second pipe outer surface; and flange securing means secured to the first flange in fixed position and to the second flange in resilient movable relation for permitting the second pipe to rotate relative to the first pipe about said seal second spherical surface and for resiliently urging the second flange against the corresponding seal spherical surface and for urging the seal first annular surface in said wedge-like relation.

* * * * *